United States Patent
Lee

(10) Patent No.: US 9,239,752 B2
(45) Date of Patent: Jan. 19, 2016

(54) SEMICONDUCTOR SYSTEM WITH ERROR DETECTION

(71) Applicant: SK hynix Inc., Icheon-si Gyeonggi-do (KR)

(72) Inventor: Hyeng Ouk Lee, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 57 days.

(21) Appl. No.: 14/019,621

(22) Filed: Sep. 6, 2013

(65) Prior Publication Data

US 2014/0344654 A1 Nov. 20, 2014

(30) Foreign Application Priority Data

May 20, 2013 (KR) .................. 10-2013-0056427

(51) Int. Cl.
*G06F 11/10* (2006.01)

(52) U.S. Cl.
CPC ............ *G06F 11/10* (2013.01); *G06F 11/1004* (2013.01)

(58) Field of Classification Search
CPC ......... H04L 1/00; H04L 29/00; H04L 1/0061; G06F 11/1443; G06F 11/10; G06F 11/08; G06F 11/00; G06F 11/1048
USPC ................................. 714/719, 758
See application file for complete search history.

(56) References Cited

U.S. PATENT DOCUMENTS

| | | | | |
|---|---|---|---|---|
| 5,544,319 | A * | 8/1996 | Acton et al. ................. | 709/246 |
| 5,787,094 | A * | 7/1998 | Cecchi et al. ................ | 714/807 |
| 7,020,811 | B2 * | 3/2006 | Byrd ............................ | 714/703 |
| 7,082,557 | B2 * | 7/2006 | Schauer et al. .............. | 714/716 |
| 7,779,334 | B2 * | 8/2010 | Earle et al. .................. | 714/763 |
| 7,836,378 | B2 * | 11/2010 | Shaeffer et al. .............. | 714/763 |
| 7,890,837 | B2 * | 2/2011 | Boskovic ..................... | 714/758 |
| 8,352,809 | B2 * | 1/2013 | Kabulepa et al. ............ | 714/703 |
| 8,898,541 | B2 * | 11/2014 | Okubo et al. ................. | 714/763 |
| 2004/0006730 | A1 * | 1/2004 | Cho et al. ..................... | 714/733 |
| 2010/0125765 | A1 * | 5/2010 | Orbach et al. ............... | 714/718 |
| 2011/0320885 | A1 * | 12/2011 | Owaki et al. ................. | 714/48 |

FOREIGN PATENT DOCUMENTS

KR 1020080024413 A 3/2008

OTHER PUBLICATIONS

Yi Wang; Min Huang; Zili Shao; Chan, H.C.B.; Bathen, L.A.D.; Dutt, N.D., "A Reliability-Aware Address Mapping Strategy for NAND Flash Memory Storage Systems," Computer-Aided Design of Integrated Circuits and Systems, IEEE Transactions on , vol. 33, No. 11, pp. 1623,1631, Nov. 2014.*

* cited by examiner

*Primary Examiner* — Cynthia Britt

(74) *Attorney, Agent, or Firm* — William Park & Associates Ltd.

(57) ABSTRACT

A semiconductor system including a semiconductor circuit configured to compare a first error detection code generated by performing an operation on read data to a second error detection code and determine a data transmission error, and a controller configured to provide the second error detection code, generated by performing an operation on expect data based on the read data, to the semiconductor circuit.

20 Claims, 5 Drawing Sheets

SEMICONDUCTOR SYSTEM WITH ERROR DETECTION

CROSS-REFERENCES TO RELATED APPLICATION

The present application claims priority under 35 U.S.C. §119(a) to Korean application number 10-2013-0056427, filed on May 20, 2013, in the Korean Intellectual Property Office, which is incorporated herein by reference in its entirety.

BACKGROUND

1. Technical Field

Various embodiments relate to a semiconductor circuit, and more particularly, to a semiconductor system.

2. Related Art

Due to various causes including noise introduced into a transmission line, an error may occur in data transmitted between a first device (for example, a semiconductor circuit) and a second device (for example, a controller to control the semiconductor circuit or a tester for testing the semiconductor circuit).

Thus, there is a demand for a method for checking and detecting whether or not the data was or is being normally transmitted between the two devices.

SUMMARY

Various embodiments are directed to a semiconductor system capable of detecting whether data was or is being normally transmitted or not and an error address.

In an embodiment of the present invention, a semiconductor system includes: a semiconductor circuit configured to generate a read data according to a read command, and determine a data transmission error by comparing a first error detection code to a second error detection code.

The semiconductor circuit may be configured to output an error address signal corresponding to the read data to a controller outside of the semiconductor circuit, when a data transmission is determined to have an error.

In an embodiment of the present invention, a semiconductor system includes: a plurality of semiconductor circuits configured to compare a first error detection code generated by performing an operation on expect data provided to the plurality of semiconductor circuits in common (applied the same way to each of the plurality of semiconductor circuits) to a second error detection code generated by performing an operation on read data, generate an error detection code, and output the generated error detection signal; and a tester configured to provide write data, to the plurality of semiconductor circuits in common during a write operation before the expect data are provided, as the expect data to the plurality of semiconductor circuits.

Each of the semiconductor circuits may be configured to determine a data transmission error according to the result obtained by comparing the first and second error detection codes and output an error address signal corresponding to the read data to a controller outside of the semiconductor circuit when the determination result corresponds to an error.

In an embodiment of the present invention, a semiconductor system includes: a semiconductor circuit including a first data input/output unit and a first error detection unit, the first data input/output unit being communicatively coupled with the first error detection unit, and the first error detection unit configured to generate a first error detection code based on data provided from the first data input/output unit; and a controller including a second data input/output unit and a second error detection unit, the second data input/output unit being communicatively coupled with the second error detection unit, and the second error detection unit configured to generate a second error detection code based on data provided from the second data input/output unit; wherein the semiconductor circuit and controller are communicatively coupled to each other through input/output pins; and wherein the second error detection unit compares the first error detection code with the second error detection code.

BRIEF DESCRIPTION OF THE DRAWINGS

Features, aspects, and embodiments are described in conjunction with the attached drawings, in which.

DETAILED DESCRIPTION

Hereinafter, a semiconductor system according to the present invention will be described below with reference to the accompanying drawings through various examples of embodiments.

Figure 1:
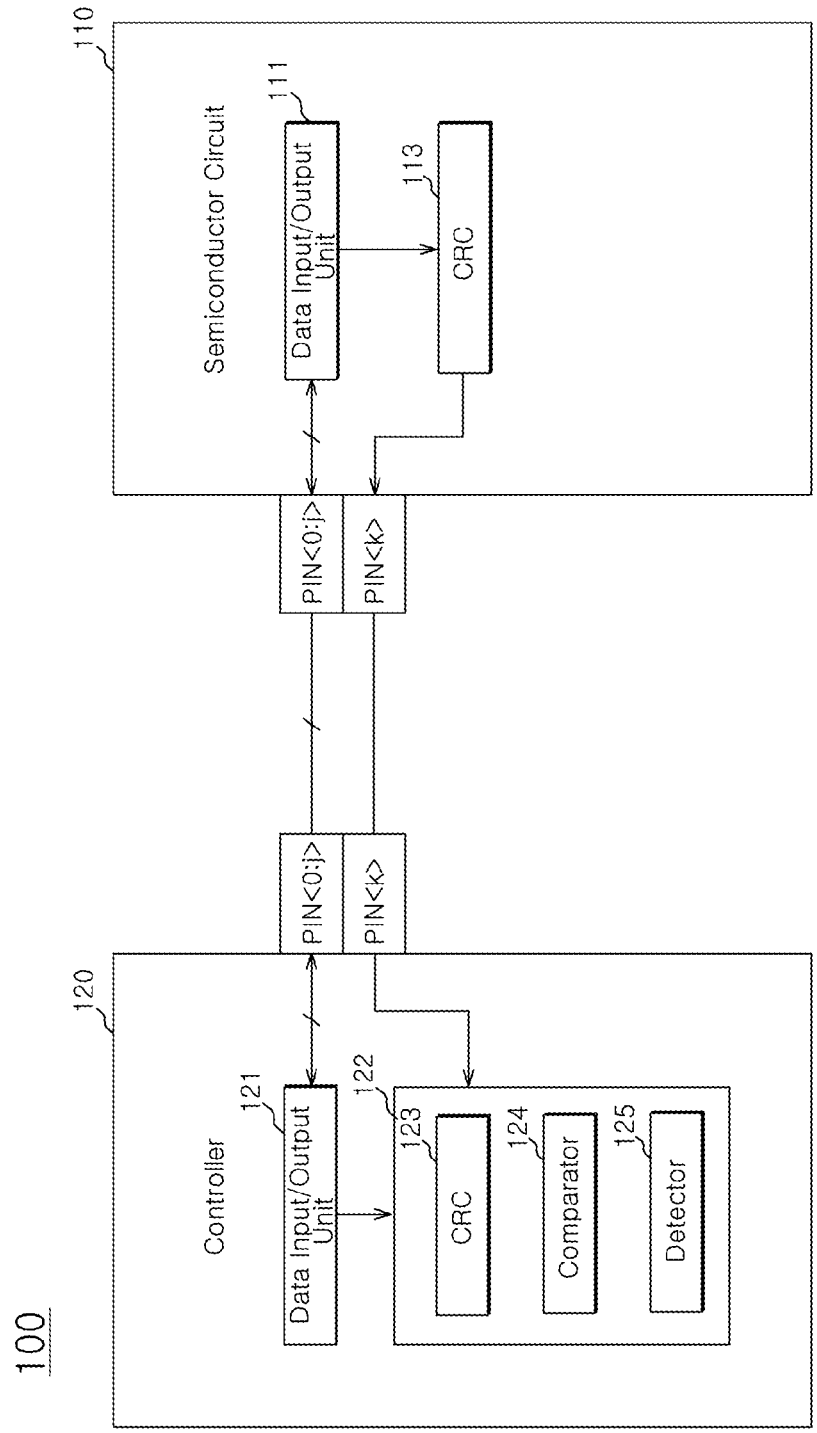
FIG. 1 is a block diagram illustrating the configuration of a semiconductor system 100 according to an embodiment of the present invention.

FIG. 1 is a block diagram illustrating the configuration of a semiconductor system 100 according to an embodiment of the present invention.

FIG. 1 illustrates an example of a semiconductor system based on a semiconductor circuit and a controller.

Referring to FIG. 1, the semiconductor system 100 according to the embodiments of the present invention may include a semiconductor circuit 110 and a controller 120.

The semiconductor circuit 110 may include input/output pins PIN<0:k> coupled to input/output pins PIN<0:k> of the controller 120, respectively.

Additionally, error information may be transmitted through any one of the input/output pins PIN<0:k>, for example, the input/output pin PIN<k>, and data may be transmitted through the other input/output pins PIN<0:j>.

The semiconductor circuit 110 may include a data input/output unit 111 and error detection code generation logic 113.

The data input/output unit 111 may be configured to perform a data interface operation between a memory area thereof and the controller 120 and the error detection code generation logic 113 according to a write command or read command. The memory area is not illustrated and may be referred to as a first memory area, for convenience of description.

The data input/output unit 111 may transmit data, transmitted through the input/output pins PIN<0:j> from the controller 120, to the error detection code generation logic 113 or the first memory area according to a write command.

The data input/output unit 111 may transmit data outputted from the first memory area to the error detection code generation logic 113 or transmit the data to the controller 120 through the input/output pins PIN<0:j> according to a read command.

The data input/output unit 111 may include a serializer/deserializer (SERDES).

Additionally, although not illustrated, various commands including write and read commands, addresses, clock signals and the like may be provided from the controller 120.

The error detection code generation logic 113 is configured to generate an error detection code (referred to as a first error detection code, for convenience of description) for the data provided from the data input/output unit 111.

In these embodiments associated with FIG. 1 of the present invention, cyclic redundancy check (CRC) may be used as the error detection code generation logic 113.

The first error detection code may include a plurality of signal bits.

The controller 120 may include a data input/output unit 121 and an error detection unit 122.

The data input/output unit 121 may be configured to perform a data interface operation between the outside of the system or a memory area thereof and the semiconductor circuit 110 and the error detection unit 122. The memory area is not illustrated and may be referred to as a second memory area, for convenience of description.

The error detection unit 122 may be configured to generate an error detection code (referred to as a second error detection code, for convenience of description) for data provided from the data input/output unit 121, compare the error detection code to the first error detection code provided from the semiconductor circuit 110, and determine whether or not the data is being or has been normally transmitted (pass or fail).

When the determination result is a fail, the error detection unit 122 may retransmit a write command or read command to the semiconductor circuit 110.

The error detection unit 122 may include error detection code generation logic 123, a comparator 124, and a detector 125.

In these embodiments associated with FIG. 1 of the present invention, CRC may be used as the error detection code generation logic 123.

The CRC 123 may be configured to perform a predetermined operation on the data provided from the data input/output logic 121 and generate the second error detection code.

Additionally, the second error detection code may include a plurality of signal bits.

The comparator 124 may be configured to sequentially compare the plurality of signal bits of the second error detection code to the respective signal bits of the first detection code provided from the semiconductor circuit 110 and sequentially output the comparison results.

The detector 125 may be configured to determine whether or not the sequential outputs of the comparator 124 define normal data transmission (pass or fail).

Figure 2:
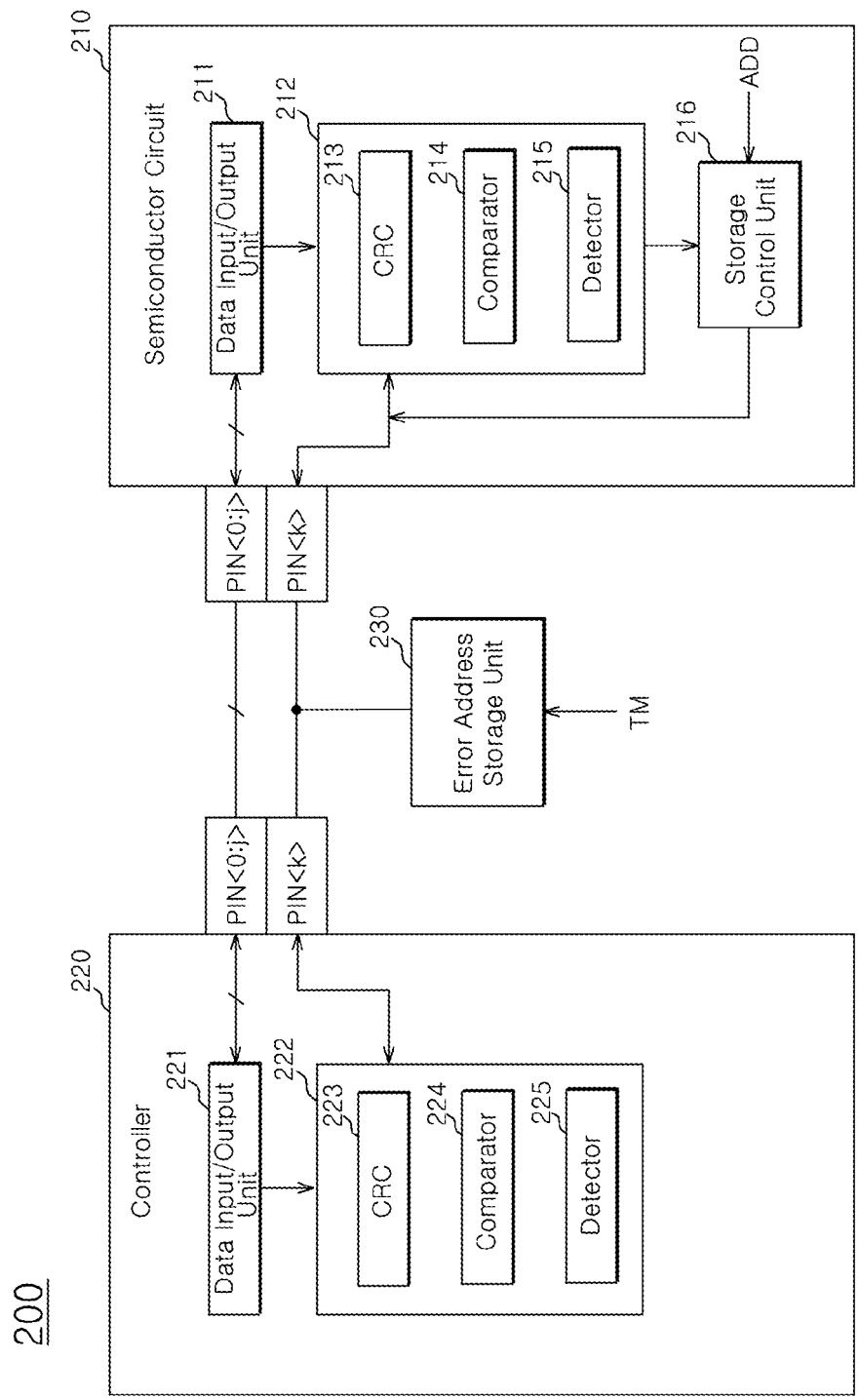
FIG. 2 is a block diagram illustrating the configuration of a semiconductor system 200 according to an embodiment of the present invention.

FIG. 2 is a block diagram illustrating the configuration of a semiconductor system 200 according to an embodiment of the present invention.

FIG. 2 illustrates a semiconductor system based on a semiconductor circuit and a controller, and a data transmission test may be performed in connection with the controller in a state where the semiconductor circuit is mounted in the system.

Referring to FIG. 2, the semiconductor system 200 according to the embodiments of the present invention may include a semiconductor circuit 210, a controller 220, and an error address storage unit 230.

The semiconductor circuit 210 may include input/output pins PIN<0:k> coupled to input/output pins PIN<0:k> of the controller 220, respectively.

Additionally, error information may be transmitted through any one of the error input/output pins PIN<0:k>, for example, the input/output pin PIN<k>, and data may be transmitted through the other input/output pins PIN<0:j>.

The semiconductor circuit 210 may include a data input/output unit 211, an error detection unit 212, and a storage control unit 216.

The data input/output unit 211 may be configured to perform a data interface operation between a memory area thereof and the controller 220 and the error detection unit 212 according to a write command or read command. The memory area is not illustrated and may be referred to as a first memory area, for convenience of description.

The data input/output unit 211 may transmit data, transmitted through the input/output pins PIN<0:j> from the controller 220, to the error detection unit 212 or the first memory area according to a write command.

The data input/output unit 211 may transmit data outputted from the first memory area to the error detection unit 212 or transmit the data to the controller 220 through the input/output pins PIN<0:j> according to a read command.

The data input/output unit 211 may include a serializer/deserializer (SERDES).

Additionally, although not illustrated, various commands including write and read commands, addresses, clock signals CK (see FIG. 3 as well) and the like may be provided from the controller 220.

The error detection unit 212 may be configured to generate an error detection code (referred to as a first error detection code, for convenience of description) for the data provided from the data input/output unit 211.

The error detection unit 212 may be configured to generate an error detection signal by comparing an error detection code provided from the controller 220 (referred to as a second error detection code, for convenience of description) to the first error detection code, and transmit the generated error detection signal to the controller 220.

The error detection unit 212 may include error detection code generation logic 213, a comparator 214, and a detector 215.

In these embodiments associated with FIG. 2 of the present invention, CRC may be used as the error detection code generation logic 213.

The CRC 213 may be configured to perform a predetermined operation on the data provided from the data input/output unit 211 and generate the first error detection code.

Additionally, the first error detection code may include a plurality of signal bits.

The comparator 214 may be configured to sequentially compare the plurality of signal bits of the first error detection code to the respective signal bits of the second error detection code provided from the controller 220 and sequentially output the comparison results.

The detector 215 may be configured to generate an error detection signal having a different logic value depending on whether or not the sequential outputs of the comparator 214 define normal data transmission (pass or fail), and provide the generated error detection signal to the storage control unit 216 or transmit the generated error detection signal to the controller 220 through the input/output pin PIN<k>.

The storage control unit 216 may be configured to store an error address signal, that is, an address signal ADD corresponding to a fail in the error address storage unit 213 through the input/output pin PIN<k>, when the error detection signal outputted from the detector 215 indicates a fail.

The storage control unit 216 may be configured to operate during a test mode.

Additionally, the semiconductor circuit 210 may enter the test mode through the controller 220. As the semiconductor circuit 210 enters the test mode, the storage control unit 216 may be enabled.

The error address storage unit 230 may be configured to store the error address signal transmitted through the input/output pin PIN<k>.

The error address storage unit 230 may be configured to store the error address signal when a test mode signal TM is activated.

Additionally, the test mode signal TM may be provided from the controller 220 or the semiconductor circuit 210.

The controller 220 may include a data input/output unit 221 and an error detection unit 222.

The data input/output unit 221 may be configured to perform a data interface operation between the outside of the system or a memory area thereof and the semiconductor circuit 210 and the error detection unit 222. The memory area is not illustrated and may be referred to as a second memory area, for convenience of description.

The data input/output unit 221 may be configured to transmit data provided from the outside of the system or the second memory area to the error detection unit 222 according to control of the controller 220.

Additionally, the controller 220 may previously designate a specific address with a write command to write specific data to the semiconductor circuit 210 during a test process of the semiconductor circuit 210.

Thus, the controller 220 may recognize expect data. That is, the controller 220 may designate the same address as the address designated with the write command in the semiconductor circuit 210 and output a read command, thereby recognizing data to be outputted from the semiconductor circuit 220.

The error detection unit 222 may be configured to provide a second error detection code, generated according to the expect data, to the semiconductor circuit 210.

The error detection unit 222 may compare the second error detection code to the first error detection code provided from the semiconductor circuit 210 and may determine whether or not data is being or has been normally transmitted (pass or fail).

When the determination result is a fail, the error detection unit 222 may retransmit a write command or read command to the semiconductor circuit 210.

The error detection unit 222 may include error detection code generation logic 223, a comparator 224, and a detector 225.

In these embodiments associated with FIG. 2 of the present invention, the CRC may be used as the error detection code generation logic 223.

The CRC 223 may be configured to perform a predetermined operation on the expect data and generate the second error detection code.

Additionally, the second error detection code may include a plurality of signal bits.

The comparator 224 may be configured to sequentially compare the plurality of signal bits of the second error detection code to the respective signal bits of the first error detection code provided from the semiconductor circuit 210 and sequentially output the comparison results.

The detector 225 may generate an error detection signal having a different logic value depending on whether or not the sequential outputs of the comparator 224 define normal data transmission (pass or fail).

Hereafter, a data transmission test of the semiconductor system 200 according to the embodiments of the present invention will be described as follows.

Figure 3:
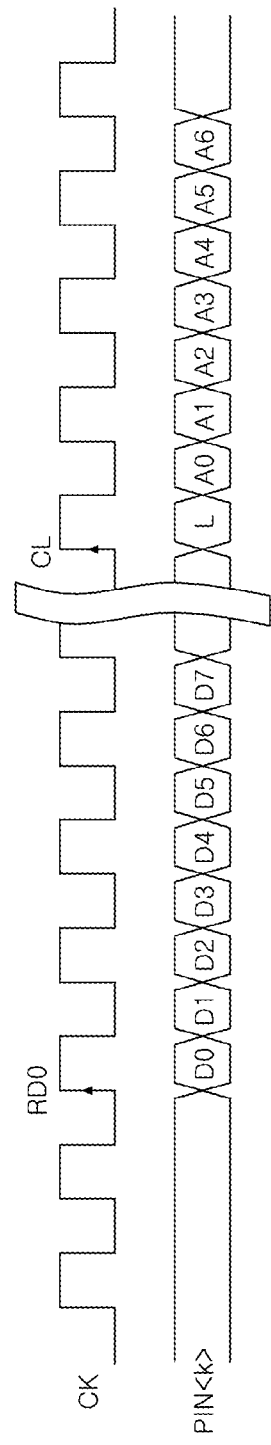
FIG. 3 is an operation timing diagram based on FIG. 2.

FIG. 3 is an operation timing diagram based on FIG. 2.

First, the controller 220 controls the semiconductor circuit 210 to enter the test mode.

Then, the controller 220 designates a specific address with a write command to write specific data to the semiconductor circuit 210.

Thus, the controller 220 may recognize expect data. That is, the controller 220 may designate the same address as the address designated with the write command and output a read command, thereby recognizing data to be outputted from the semiconductor circuit 210.

The controller 220 provides the expected data to the error detection unit 222 through the data input/output unit 221.

Referring to FIG. 3, the controller 220 provides a read command RD0 and the second error detection code generated through the error detection unit 222 to the semiconductor circuit 210 through the input/output pin PIN<k>.

The semiconductor circuit 210 provides data (i.e., D0 to D7) corresponding to the read command RD0 to the error detection unit 212 through the data input/output unit 211 in a state where the semiconductor circuit 210 entered the test mode through the controller 220.

The error detection unit 212 generates a first error detection code for the data corresponding to the read command RD0, and compares the generated first error detection code to the second error detection code to generate an error detection signal.

When the error detection signal outputted from the error detection unit 212 has a level defining a fail (for example, logic low 'L'), the storage control unit 216 outputs the error detection signal and an error address signal, that is, address signals A0 to A6 corresponding to the read command to the error address storage unit 230 through the input/output pin PIN<k>.

At this time, the error detection signal and the error address signal may be transmitted after column address strobe CAS latency (CL).

The error address storage unit 230 stores the error address signal when the test mode signal TM is activated.

Figure 4:
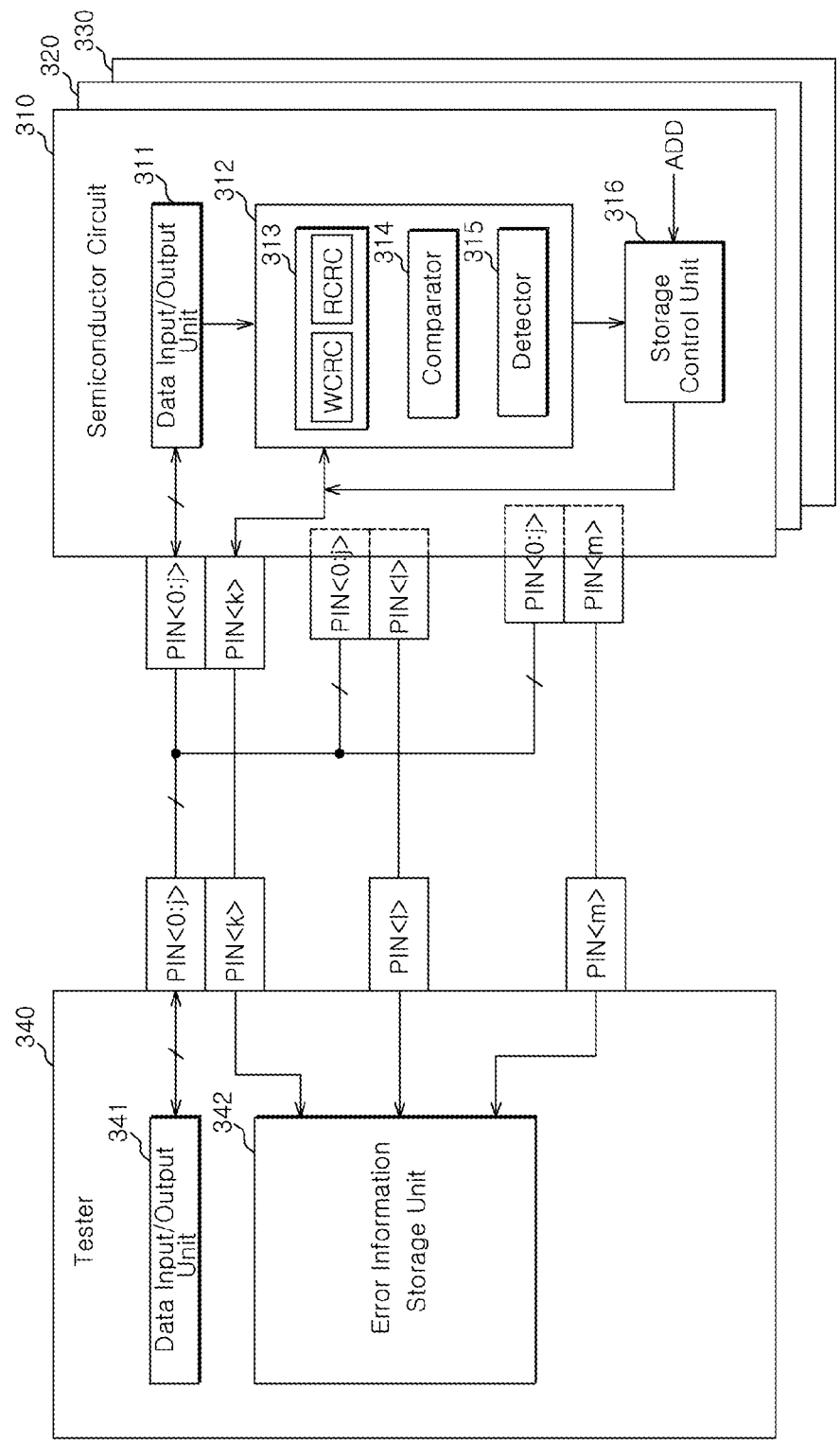
FIG. 4 is a block diagram illustrating the configuration of a semiconductor system 300 according to an embodiment of the present invention.

FIG. 4 is a block diagram illustrating the configuration of a semiconductor system 300 according to an embodiment of the present invention.

FIG. 4 illustrates a semiconductor system based on a plurality of semiconductor circuits and a tester, and a data transmission test may be performed through the tester before the plurality of semiconductor circuits are mounted in the system.

Referring to FIG. 4, the semiconductor system 300 according to the embodiments of the present invention may include the plurality of semiconductor circuits 310 to 330 and the tester 340.

The tester 340 may include input/output pins PIN<0:j> which are commonly coupled to input/output pins PIN<0:j> of the plurality of semiconductor circuits 310 to 330.

The tester 340 may further include input/output pins PIN<k, l, m> which are independently coupled to an input/output pin PIN<k> of the semiconductor circuit 310, an input/output pin PIN<l> of the semiconductor circuit 320, and an input/output pin PIN<m> of the semiconductor circuit 330.

The plurality of semiconductor circuits 310 to 330 may be configured in substantially the same manner, and each of the semiconductor circuits 310 to 330 may include a data input/output unit 311, an error detection unit 312, and a storage control unit 316.

The data input/output unit 311 may be configured to perform a data interface operation between a memory area thereof and the tester 340 and the error detection unit 312 according to a write command or read command. The memory area is not illustrated, and may be referred to as a first memory area, for convenience of description.

The data input/output unit 311 may transmit data, transmitted through the input/output pins PIN<0:j> from the tester 340, to the error detection unit 312 or the first memory area according to a write command.

The data input/output unit 311 may transmit data outputted from the first memory area to the error detection unit 312 or transmit the data to the tester 340 through the input/output pins PIN<0:j> according to a read command.

The data input/output unit 311 may include a serializer/deserializer (SERDES).

Additionally, although not illustrated, various commands including write and read commands, addresses, clock signals CK (see FIG. 5 as well) and the like may be provided from the tester 340.

The error detection unit 312 may be configured to generate a first error detection code and a second error detection code for write data and read data provided through the data input/output unit 311, respectively.

The error detection unit 312 may be configured to generate an error detection signal by comparing the first and second error detection codes and transmit the generated error detection signal to the tester 340 through the input/output pin PIN<k>.

The error detection unit 312 may include error detection code generation logic 313, a comparator 314, and a detector 315.

In these embodiments associated with FIG. 4 of the present invention, CRC is used as the error detection code generation logic 313.

The error detection code generation logic 313 may include a write cyclic redundancy check (WCRC) block and a read cyclic redundancy check (RCRC) block.

The WCRC block may be configured to perform a predetermined operation on write data provided through the data input/output unit 211 from the tester 340 and generate the first error detection code.

At this time, the first error detection code may include a plurality of signal bits.

The RCRC block may be configured to perform a predetermined operation on read data provided from the first memory area, that is, the memory area thereof and generate the second error detection code.

At this time, the second error detection code may include a plurality of signal bits.

The RCRC block may be configured to sequentially compare the plurality of signal bits of the first error detection code to the respective signal bits of the second error detection code and sequentially output the comparison results.

The detector 315 may be configured to generate an error detection signal having a different logic value depending on whether the sequential outputs of the comparator 314 correspond to a desired value or not (pass or fail).

The detector 315 may be configured to provide the error detection signal to the storage control unit 316 or transmit the data to the tester 340 through the input/output pin PIN<k>.

The storage control unit 316 may be configured to transmit an error address signal, that is, an address signal ADD corresponding to a fail to the tester 340 through the input/output pin PIN<k>, when the error detection signal outputted from the detector 315 has a value defining a fail.

The tester 340 may include a data input/output unit 341 and an error information storage unit 342.

The data input/output unit 341 may be configured to perform a data interface operation between the outside or a memory area thereof and the plurality of semiconductor memory circuits 310 to 330. The memory area is not illustrated and may be referred to as a second memory area, for convenience of description.

The data input/output unit 341 may be configured to provide write data to the plurality of semiconductor circuits 310 to 330 according to control of the tester 340.

The error information storage unit 342 may be configured to store the error detection signal and the error address signal provided from the semiconductor circuit 310.

Hereafter, a data transmission test of the semiconductor system 300 according to the embodiments of the present invention will be described.

Figure 5:
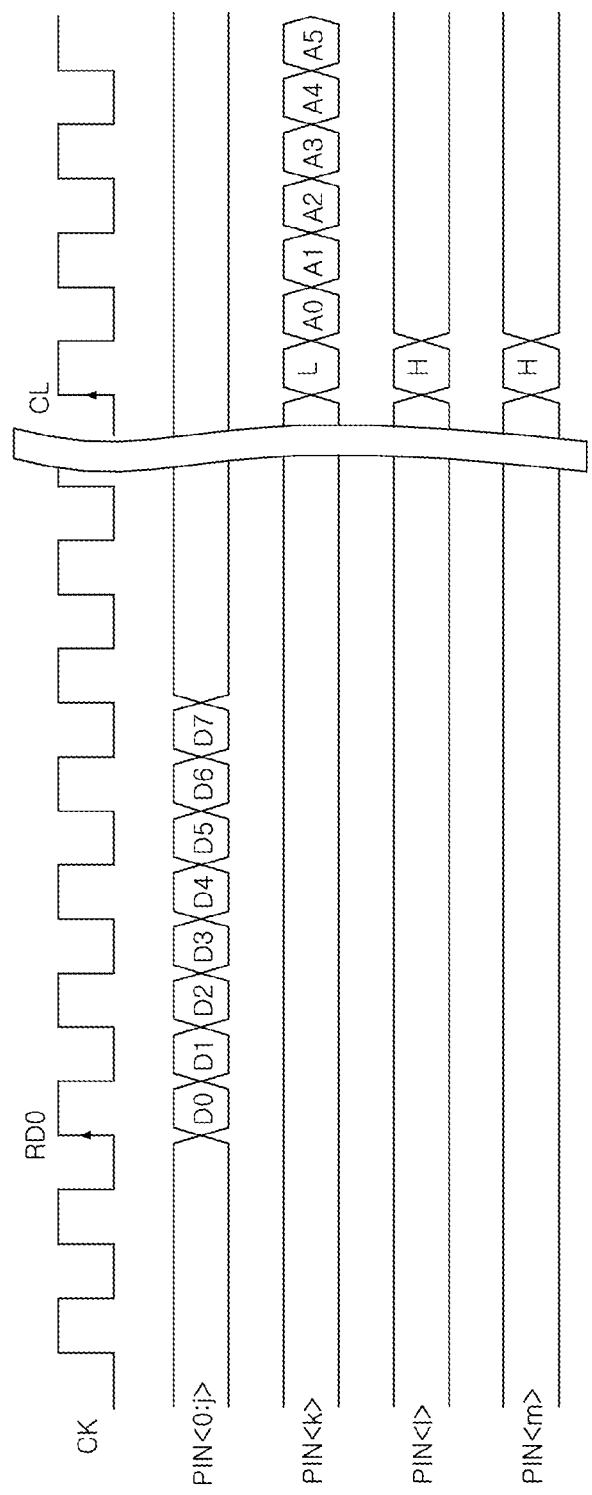
FIG. 5 is an operation timing diagram based on FIG. 4.

FIG. 5 is an operation timing diagram based on FIG. 4.

The tester 340 transmits a write command and write data designating a specific address to the plurality of semiconductor circuits 310 to 330 at the same time or substantially the same time.

Thus, the same data are written to the specific addresses of the plurality of semiconductor circuits 310 to 330.

Referring to FIG. 5, the tester 340 transmits a read command RD0 and expect data to the plurality of semiconductor circuits 310 to 330.

At this time, the expect data, which have been transmitted with the write command to the plurality of semiconductor circuits 310 to 330 at the same time or substantially the same time, may include data which are expected to be outputted from the plurality of semiconductor circuits 310 to 330 according to the read command RD0.

The plurality of semiconductor circuits 310 to 330 provide data (i.e., D0 to D7) corresponding to the read command RD0 to the error detection unit 312 through the data input/output unit 311.

The error detection unit 312 generates the first error detection code for the expect data transmitted from the tester 340 using the WCRC block, and generates the second error detection code for read data corresponding to the read command RD0 using the RCRC block.

The error detection unit 312 compares the first and second error detection codes and generates an error detection signal.

When the error detection signal outputted from the error detection unit 312 has a level defining a data transmission fail (for example, logic low 'L'), the storage control unit 316 outputs the error detection signal and an error address signal, that is, an address signal ADD corresponding to the read command to the input/output pin PIN<k>.

At this time, suppose that the error detection signal of the semiconductor circuit 310 among the plurality of semiconductor circuits 310 to 330 has a logic low level and the error detection signals of the other semiconductor circuits 320 and 330 have a logic high level.

After CAS latency (CL), the low-level error detection signal (i.e., L) and the error address signal (i.e., A0 to A5) are transmitted through the input/output pin PIN<k> of the tester 340, and the high-level error detection signal (i.e., H) is transmitted through the input/output pins PIN<l,m>.

The error address signal and the error detection signals transmitted from the plurality of semiconductor circuits 310 to 330 are stored in the error information storage unit 342.

According to the embodiments of the present invention, the semiconductor system may detect whether data is being or has been normally transmitted or not and an error address, and reduce a test time.

While various embodiments have been described above, it will be understood to those skilled in the art that the embodiments described are by way of example only. Accordingly, the semiconductor system described herein should not be limited based on the described embodiments. Rather, the semiconductor system described herein should only be limited in light of the claims that follow when taken in conjunction with the above description and accompanying drawings.

What is claimed is:

1. A semiconductor system comprising:
a semiconductor circuit configured to generate a read data in response to a read command, and determine a data transmission error by comparing a first error detection code to a second error detection code; and
a controller configured to designate a specific address with a write command to the semiconductor circuit, send the read command to the semiconductor circuit, and send the second error detection code to an error detection unit of the semiconductor circuit,
wherein the first error detection code is generated by performing an error detection operation on the read data, and the second error detection code is generated by performing the error detection operation on expect data,
wherein the expect data is data being read from the semiconductor circuit by designating the specific address with the read command to the semiconductor circuit.

2. The semiconductor system of claim 1, wherein the semiconductor circuit is configured to output an error address signal corresponding to the read data, when a result obtained by determining the data transmission error corresponds to an error.

3. The semiconductor system of claim 2, further comprising an error address storage unit configured to store the error address signal.

4. The semiconductor system of claim 3, wherein the error address storage unit is provided inside or outside the semiconductor circuit.

5. The semiconductor system of claim 3, wherein the error address storage unit is configured to store the error address signal in response to a test mode signal.

6. The semiconductor system of claim 2, wherein the semiconductor circuit is configured to output the error address signal through any one of input/output pins.

7. The semiconductor system of claim 2, wherein the semiconductor circuit comprises:
a data input/output unit configured to perform a data interface operation between a memory area of the semiconductor circuit and the controller;
the error detection unit configured to generate the first error detection code by performing the error detection operation on the read data and transmit an error detection signal generated by comparing the second error detection code and the first error detection code to the controller; and
a storage control unit configured to output the error address signal when the error detection signal has a value corresponding to the data transmission error.

8. The semiconductor system of claim 1, wherein the semiconductor circuit comprises:
a data input/output unit configured to perform a data interface operation between a memory area of the semiconductor circuit and the controller; and
the error detection unit configured to generate the first error detection code by performing the error detection operation on the read data provided through the data input/output unit, and transmit an error detection signal generated by comparing the second error detection code and the first error detection code to the controller.

9. The semiconductor system of claim 8, wherein the error detection unit comprises:
error detection code generation logic configured to generate the first error detection code by performing the error detection operation on the read data;
a comparator configured to sequentially compare a plurality of signal bits of the first error detection code to a plurality of signal bits of the second detection code, and output the comparison results; and
a detector configured to generate an error detection signal having different logic values depending on the sequential outputs of the comparator.

10. The semiconductor system of claim 1, wherein the controller comprises:
a data input/output unit configured to perform a data interface operation between a memory area of the controller and the semiconductor circuit; and
the error detection unit configured to transmit the second error detection code, generated by performing the error detection operation on the expect data, to the semiconductor circuit.

11. The semiconductor system of claim 1, wherein the semiconductor circuit is configured to transmit an error detection signal, based on the result obtained by determining the data transmission error, to the controller after column address strobe latency from the time point at which a read command is inputted.

12. A semiconductor system comprising:
a plurality of semiconductor circuits configured to generate an error detection signal by comparing a first error detection code to a second error detection code, and output the error detection signal according to a read command;
wherein the first error detection code is generated by performing an error detection operation on expect data, and the second error detection code is generated by performing the error detection operation on read data, and
a tester configured to provide the read command and the expect data to the plurality of semiconductor circuits in common,
wherein the expect data is data provided to the plurality of semiconductor circuits during a previous write operation, and
wherein the second error detection code is sent to an error detection unit by a controller.

13. The semiconductor system of claim 12, wherein each of the semiconductor circuits is configured to determine a data transmission error according to a result obtained by comparing the first and second error detection codes and output an error address signal corresponding to the read data to a controller outside of the semiconductor circuit when the determination result corresponds to an error.

14. The semiconductor system of claim 13, wherein the semiconductor circuit provides the error address signal to the controller outside of the semiconductor circuit through any one of input/output pins thereof.

15. The semiconductor system of claim 13, wherein the semiconductor circuit comprises:
a data input/output unit configured to perform a data interface operation between a memory area thereof and the tester;
the error detection unit configured to transmit the error detection signal generated by comparing the second error detection code and the first error detection code to the tester; and a storage control section configured to output the error address signal to the controller outside of the semiconductor circuit, when the error detection signal has a value corresponding to a data transmission error.

16. The semiconductor system of claim 13, wherein the tester comprises:
   a data input/output unit configured to perform a data interface operation between a memory area thereof and the plurality of semiconductor circuits; and
   an error information storage unit configured to store the error detection signal and the error address signal.

17. The semiconductor system of claim 12, wherein each of the semiconductor circuits comprises:
   a data input/output unit configured to perform a data interface operation between a memory area thereof and the tester; and
   the error detection unit configured to transmit the error detection signal generated by comparing the second error detection code and the first error detection code to the tester.

18. The semiconductor system of claim 17, wherein the error detection unit comprises:
   error detection code generation logic configured to generate the first error detection code by performing the error detection operation on the expect data provided through the data input/output unit, and generate the second error detection code by performing the error detection operation on the read data provided through the data input/output unit;
   a comparator configured to sequentially compare a plurality of signal bits of the first error detection code to a plurality of signal bits of the error detection code and output the comparison results; and
   a detector configured to generate the error detection signal according to the sequential outputs of the comparator.

19. The semiconductor system of claim 12, wherein the tester comprises:
   a data input/output unit configured to perform a data interface operation between a memory area thereof and the plurality of semiconductor circuits; and
   an error information storage unit configured to store the error detection signal.

20. The semiconductor system of claim 12, wherein the plurality of semiconductor circuits are configured to transmit the error detection signal to the tester after column address strobe latency from the time point at which the read command is inputted.

* * * * *